US 6,651,936 B2

(12) United States Patent
Upson et al.

(10) Patent No.: US 6,651,936 B2
(45) Date of Patent: Nov. 25, 2003

(54) MOUNTING BRACKET FOR MOUNTING A STANDARDIZED ISO AUDIO COMPONENT WITHIN A DIN APERTURE

(75) Inventors: Jacqueline S. Upson, Daytona Beach, FL (US); R. Spencer Quilling, II, Glenwood, FL (US)

(73) Assignee: Metra Electronics Corporation, Holly Hill, FL (US)

( * ) Notice: Subject to any disclaimer, the term of this patent is extended or adjusted under 35 U.S.C. 154(b) by 0 days.

(21) Appl. No.: 10/082,157

(22) Filed: Feb. 26, 2002

(65) Prior Publication Data

US 2003/0160134 A1 Aug. 28, 2003

(51) Int. Cl.⁷ .................................................. G12B 9/00
(52) U.S. Cl. ..................................... 248/27.3; 248/27.1
(58) Field of Search ............................... 248/27.1, 27.3, 248/231.81, 231.9, 231.91; 296/70; 361/683, 686; 312/333

(56) References Cited

U.S. PATENT DOCUMENTS

| | | | | |
|---|---|---|---|---|
| 4,577,818 A | * | 3/1986 | Clarisse ..................... 248/27.3 |
| 4,816,966 A | * | 3/1989 | Frankowski ................ 200/295 |
| 4,993,668 A | * | 2/1991 | Inamura .................... 248/27.3 |
| 5,366,186 A | * | 11/1994 | Weyeneth ................ 248/231.9 |
| 5,381,684 A | * | 1/1995 | Kawamura .................... 174/51 |
| 5,467,947 A | | 11/1995 | Quilling, II ................ 248/27.1 |
| 5,560,572 A | * | 10/1996 | Osborn et al. ............. 248/201 |
| 5,779,197 A | | 7/1998 | Kim ......................... 248/27.1 |
| 5,826,836 A | | 10/1998 | Gallichan et al. .......... 248/27.3 |
| 6,158,699 A | * | 12/2000 | Boe ......................... 248/27.1 |
| 6,283,417 B1 | * | 9/2001 | Ikunami ................... 248/27.3 |
| 6,318,679 B1 | * | 11/2001 | Yang et al. ................ 248/201 |

OTHER PUBLICATIONS

Metra 2001 Autosound Installation Products Catalog, pp. cover, 1–62, Published May 2001.

* cited by examiner

Primary Examiner—Anita King
Assistant Examiner—Tan Le
(74) Attorney, Agent, or Firm—Fitzpatrick, Cella, Harper & Scinto

(57) ABSTRACT

A pair of brackets for mounting an ISO audio component securely within a DIN aperture. Each bracket has a mounting component for abutting against a vertical side and a front reveal portion of the ISO component. A securing clip protrudes from the mounting component for detachably securing the ISO audio component within the DIN aperture, while an engaging component substantially engages a front edge of the ISO audio component.

12 Claims, 8 Drawing Sheets

SECTION: 6-6

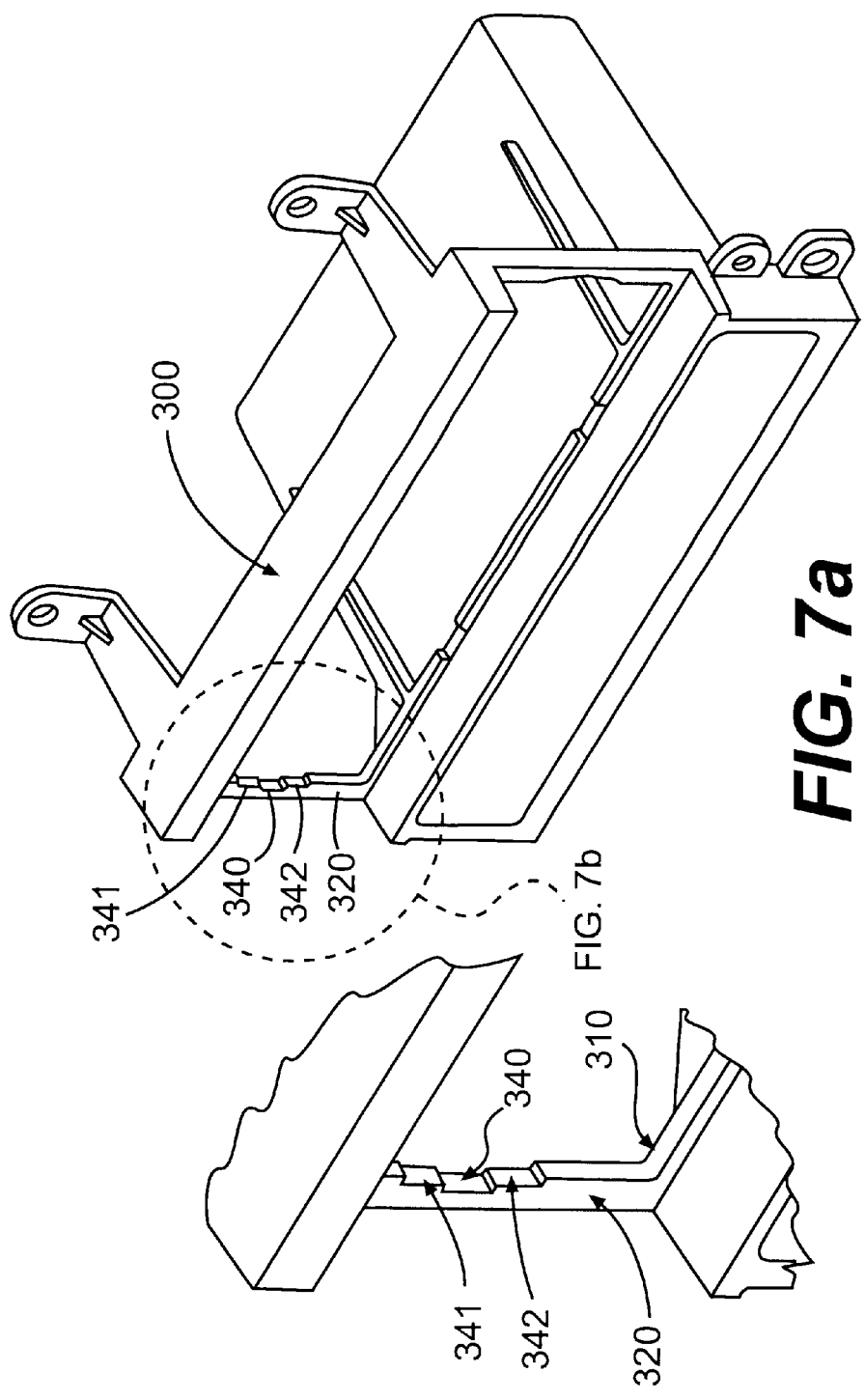

MOUNTING BRACKET FOR MOUNTING A STANDARDIZED ISO AUDIO COMPONENT WITHIN A DIN APERTURE

BACKGROUND OF THE INVENTION

1. Field of the Invention

The present invention relates generally to a bracket or kit for mounting automotive audio components, and in particular to detachably mounting an ISO audio component within a DIN aperture.

2. Description of the Related Art

Vehicle owners seek to securely install a wide variety of audio components within their vehicles. Many mounting kits have been designed to mount aftermarket audio components in factory-formed apertures. These aftermarket components are usually either of an ISO-mount type or of a DIN-mount type. An ISO-mount audio component is characterized by a standard body size and includes a standard pattern of mounting holes on the vertical sides of the component. Similarly, a DIN-mount unit has a standard body size, but unlike the ISO-mount component, it utilizes a DIN cage for mounting within a DIN-specific aperture.

While aftermarket audio units are generally of a standard size, the automobile apertures into which they are mounted usually differ in size and composition with varying automobile manufacturers. To overcome this problem, kits such as those disclosed in U.S. Pat. No. 5,467,947 have been designed, for installing a radio into a vehicle dashboard. Such installation kits include a radio housing and several auxiliary components to mount the radio to the housing. If the component to be mounted is an ISO-mount type, mounting brackets are fastened to the component before it is affixed to the housing. If, however, the component to be mounted is a DIN-mount type, a DIN cage must be fastened to the housing, and the radio is then secured within the DIN cage. Such an arrangement securely mounts an audio component, but in order to remove the mounted component from the vehicle, one must gain access to the area behind the housing (i.e., the dashboard must be removed). Additionally, a DIN cage must be used to secure a component in a DIN aperture.

U.S. Pat. No. 5,779,197 discloses another apparatus for detachably mounting audio equipment. According to this disclosure, a mounting frame containing engagement apertures is installed in a dashboard. Lock claws are then installed in a main chassis which also contains an audio component. The main chassis is slidably inserted into the dashboard, and the chassis is secured when the lock claws engage the engagement apertures. To remove the main chassis and thus the audio component, a specially designed disengage key is inserted into the face of the main chassis to disengage the lock claws from the engagement apertures. While this apparatus does allow for easier removal of audio equipment, it requires a key unique to the apparatus. Additionally, several components are required.

U.S. Pat. No. 5,826,836 describes a component to be aligned within an aperture of an automobile which includes a retaining clip that mounts to the side of the component. The retaining clip further engages an aperture in the face of the component and thereby creates a spring action that allows for application of pressure to the inner periphery of the aperture in the dashboard. The component is mounted by only two retaining clips, but the retaining clips require the face of the component to be specially designed; the clips are not designed to work with a standard ISO mount unit. Furthermore, the clips are not able to install a component into a DIN-mount aperture.

Accordingly, there is a need in the art for a simplified apparatus for installing a standardized ISO-mount audio component within a DIN-mount aperture, without using a separate DIN cage.

There is a further need for such an apparatus that can be securely fixed in place without extra support, but that can be easily removable.

SUMMARY OF THE INVENTION

The present invention addresses the foregoing needs in the art by providing a mounting bracket for detachably securing a standardized ISO-mount audio component within a DIN-mount aperture.

In a first aspect of the present invention, a mounting bracket for mounting an ISO audio component within a DIN aperture includes a mounting component, a plurality of apertures through the mounting component, a securing clip protruding from the mounting component, and an engaging component formed on a forward side of the mounting component. The mounting component abuts a vertical side of the ISO audio component, the plurality of apertures allow screws to be inserted to affix the mounting bracket to the audio component, the securing clip detachably secures the ISO audio component within the DIN aperture, and the engaging component substantially engages a front edge of the ISO audio component.

A better understanding of these and other objects, features, and advantages of the present invention may be had be reference to the drawings and to the accompanying description, in which there are illustrated and described a preferred embodiment of the invention.

BRIEF DESCRIPTION OF THE DRAWINGS

FIGS. 7*a* and 7*b* are front perspective and detail perspective views according to the FIG. 1 preferred embodiment of the present invention.

DESCRIPTION OF THE PREFERRED EMBODIMENT

Figure 1:
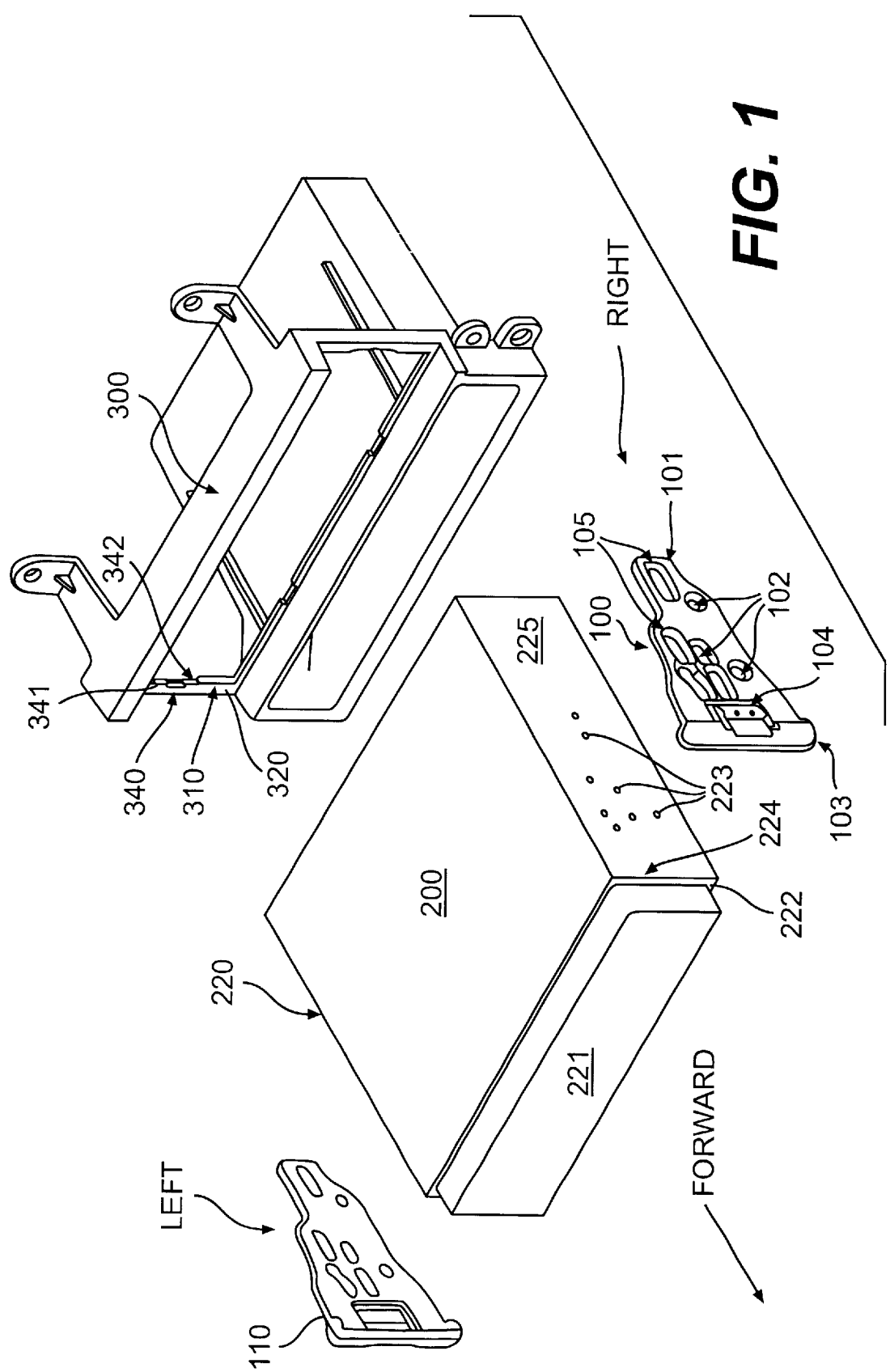
FIG. 1 is an exploded perspective view of a preferred embodiment of a mounting kit in combination with a standard ISO component, according to the present invention.

Referring to FIG. 1, a preferred embodiment of a right-side mounting bracket 100 and a left-side mounting bracket 110 according to the present invention is shown in explosion view, in the context of its use with a representative ISO dimensioned component 200 and a representative DIN aperture dimensioned installation kit 300. The left-side mounting bracket 110 is a mirror image to right-side mounting bracket 100, and both are designed for installing any autosound component 200 having dimensions and mounting apertures according to the ISO standard (an ISO component) into a vehicle dash of any specific configuration, through a novel interconnection with an autosound installation kit 300 having dimensions and mounting apertures according to the DIN standard (a DIN aperture). The following discussion of structural features of the right-side mounting bracket 100 applies equally to the left-side mounting bracket 110.

The right-side mounting bracket 100 is comprised of a mounting component 101, a plurality of holes 102 through the mounting component 101, an engaging component 103, and a securing clip 104. The representative ISO component 200 is characterized by a standardized construction including a specific pattern of threaded apertures on the right and left vertical sides of main body 200, with apertures 223 on the right-side 225 being illustrated. A mirror image of the specific pattern of threaded apertures 223 is on the left vertical side 220 of main body 200 (not shown). The ISO component 200 conventionally also has a control interface panel 221 disposed on a front surface of the main body. Because the interface panel 221 on an ISO component has a smaller front profile than the main body 220, an edge or step 224 comprises a reveal portion 222 of the front surface of the main body 220, which remains exposed. The aperture 310 on the representative DIN dimensioned installation kit 300 slightly differs from a standard DIN construction, in that a step is defined by inner land 340 and adjacent lands 341 and 342 on the left side of the DIN aperture 310, with a mirror image of that step on the right side of the DIN aperture 310. This feature is illustrated in detail at FIGS. 7a, 7b and FIGS. 8a, 8b.

The mounting component 101 of right-side mounting bracket 100 abuts against the right vertical side 225 of ISO component 200. The array of apertures 102 formed through the mounting component 101 register with at least some of the plurality of threaded apertures holes 223 on a vertical side 225 of the main body 220 of ISO component 200. At least one threaded machine screw or equivalent fastener (not shown) is used to secure the right-side mounting bracket 100 against the right-side of ISO component 200. In a preferred embodiment, the plurality of apertures 102 further comprise holes and slots formed with a countersink 105 to accept flat head screws (not shown), so that the heads of the screws do not protrude beyond an outer surface of the right-side mounting bracket 100. A mirror image construction would be used on the left-side mounting bracket 110. Alternatively, the plurality of apertures 102 may consist of only straight sided holes or slots, particularly if fasteners other than flat head screws are to be used.

Figure 5:
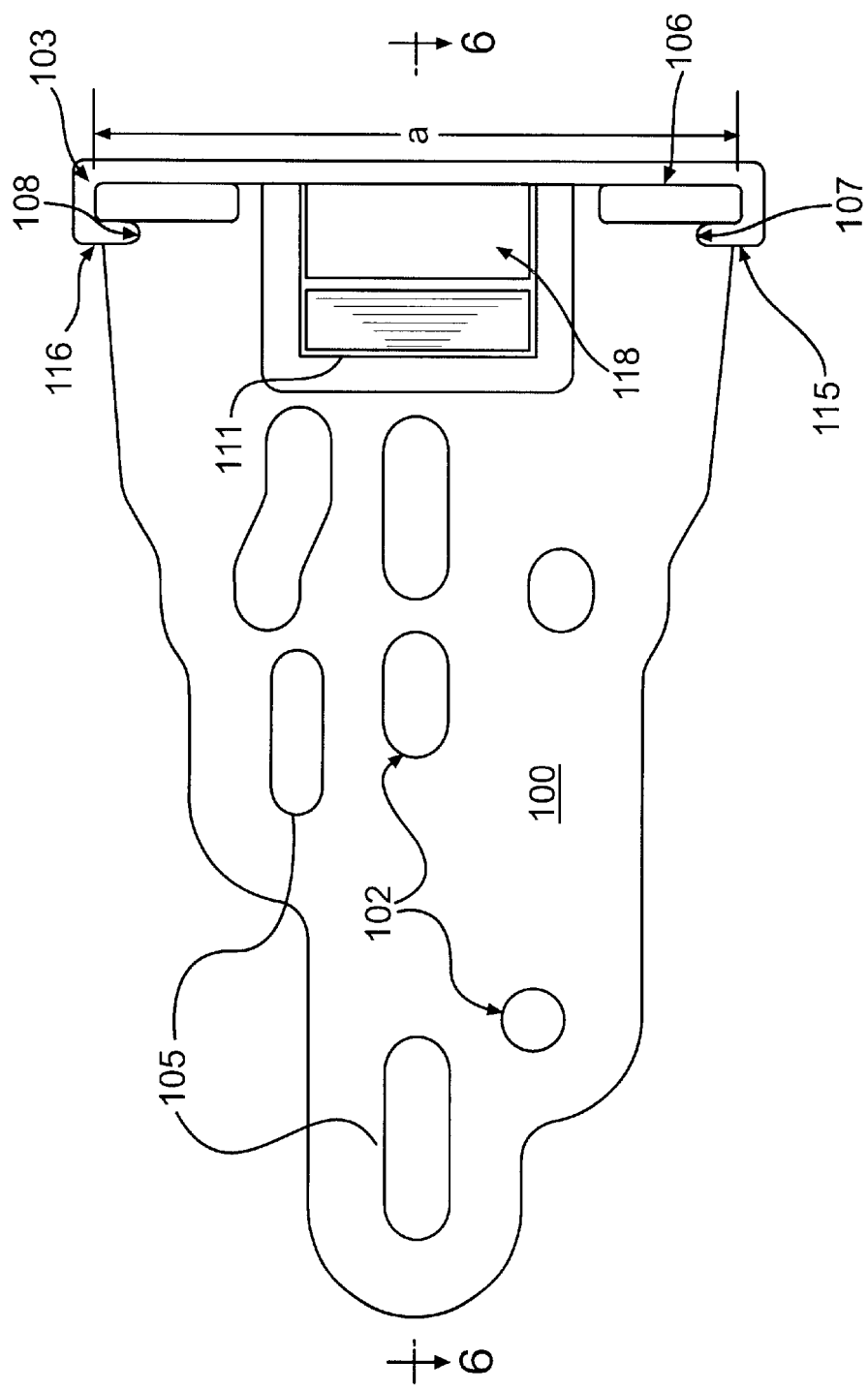
FIG. 5 is an inside elevation view of a right-side mounting bracket according to the FIG. 1 preferred embodiment of the present invention, the inside elevation view of a left-side mounting bracket according to the FIG. 1 being a mirror image thereof.

A first contact is defined by perpendicular inner wall surfaces 106 and 118 of the engaging component 103 being urged against reveal 222 and edge 224 on the front of the ISO component. Affixing the right-side mounting bracket 100 to the ISO component 200 using the apertures 102 urges engaging component 103 into substantial contact with the front right edge 224 and the reveal 222. As shown in detail at FIG. 5, the engaging component 103 further comprises a vertical front surface 106 formed perpendicular to inner surface of the mounting component portion 101 of right-side mounting bracket 100, for substantially engaging front right edge 224 and reveal 222 when right-side mounting bracket 100 is secured to the ISO component 200. Additionally, the engaging component 103 includes a top element 115 with a distal end 107 and a bottom element 116 with a distal end 108. The vertical distance labeled "a", between the inside of top element 115 and the inside of bottom element 116 is substantially equal to the vertical height of representative ISO component 200, in the vicinity of the front right edge 224. The top element 115 and the bottom element 116 extend horizontally and rearwardly proximate a top and bottom portion of the vertical front surface 106, and the vertical space between the distal ends 107, 108 is slightly less than the dimension "a", as illustrated in FIG. 5. The web 104 has a vertical side inner surface 118 that is normally perpendicular to vertical front inner surface 106 and creates a corner with vertical surface 106. A tight contact between the brackets and the ISO component is achieved by the fasteners and a first resilient engagement against the top and bottom surfaces of the ISO component as the distal ends 107, 108, are spread to accommodate the dimension "a", as illustrated in FIG. 5.

Figure 6:
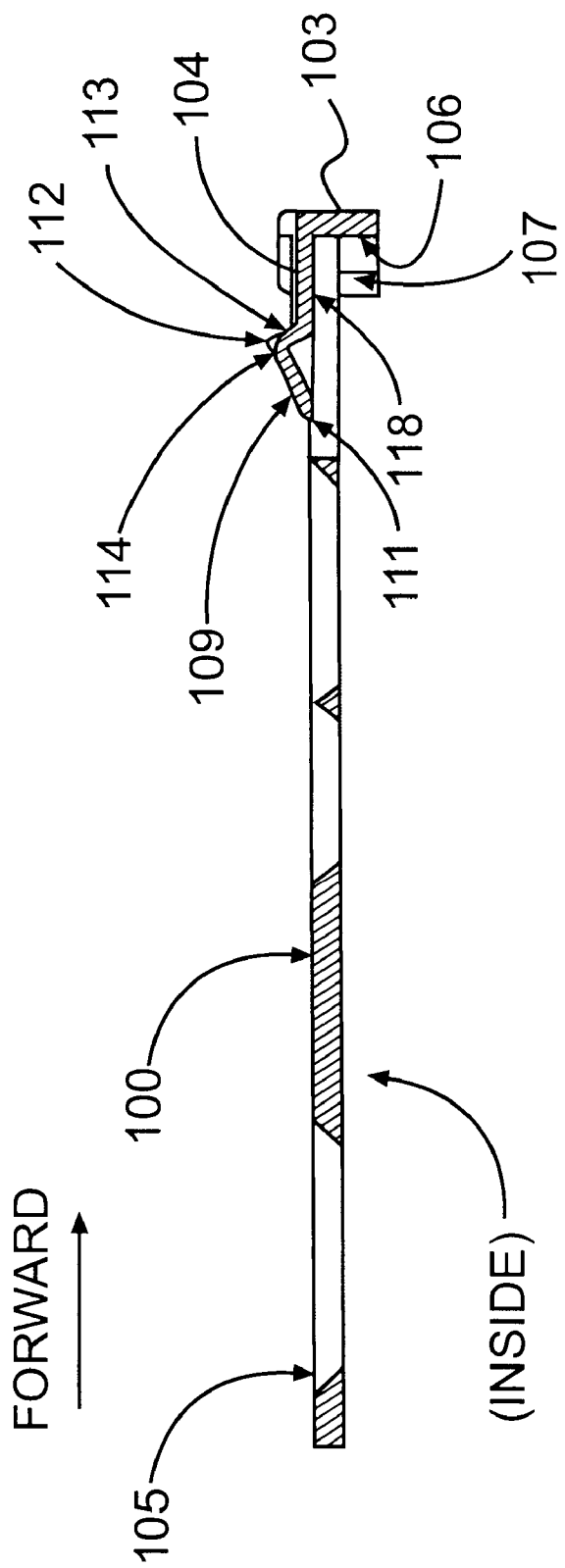
FIG. 6 is a horizontal cross-sectional view of a right-side mounting bracket along section line 6—6 of FIG. 5, a horizontal cross-sectional view of a left-side mounting bracket according to the FIG. 1 being a mirror image thereof.
Figure 8B:
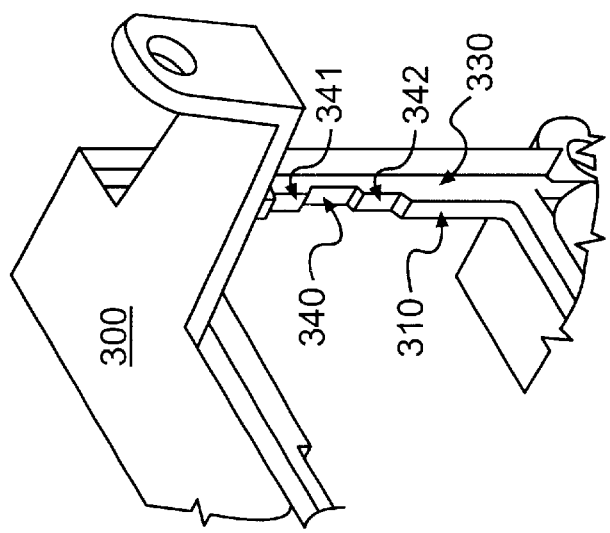
FIGS. 8*a* and 8*b* are rear perspective and detail perspective views according to the FIG. 1 preferred embodiment of the present invention.
Figure 8A:
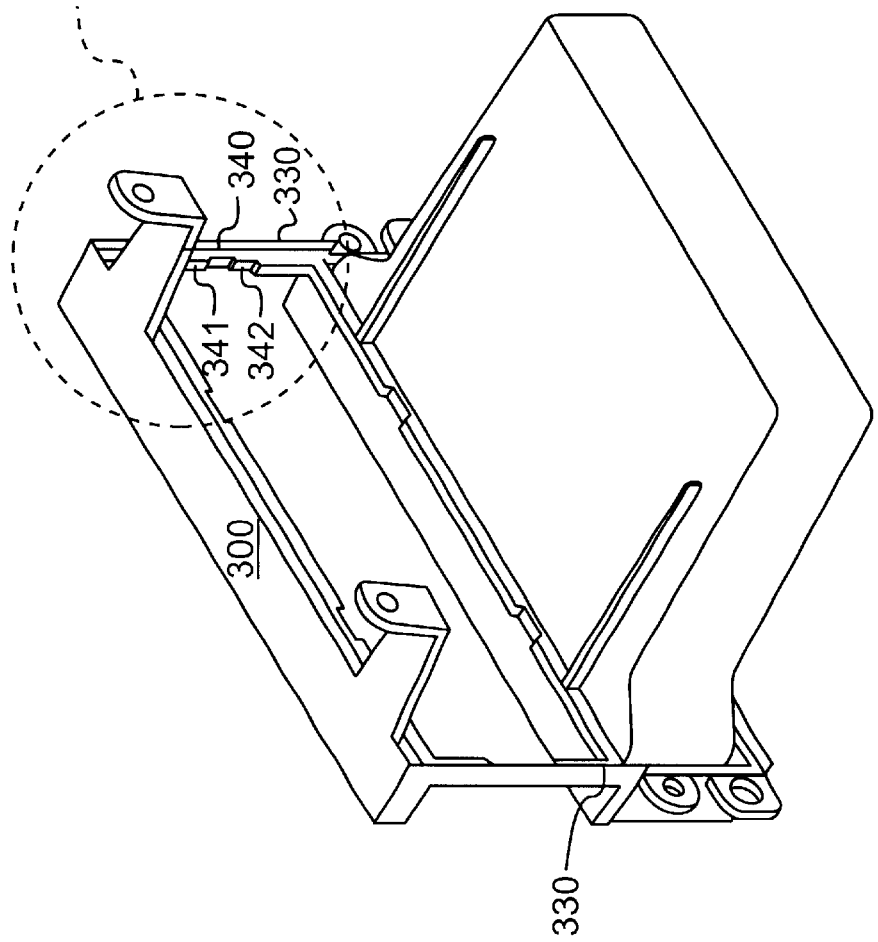

FIGS. 5 and 6 further illustrate the feature of a securing clip 104 for detachably securing the ISO component 200 within the DIN aperture 310. The cantilever and shape of securing clip 104 is best seen through the cross-section view of FIG. 6. The securing clip 104 comprises an angled leading ramp 109 and a trailing ramp 113, which are cantilevered by web 104 that has an inner surface 118 normally parallel to and spaced away from the side of the ISO component. The leading ramp 109 has a small angle of inclination with respect to the plane of web 104 and extends from a distal edge 111 to an apex edge 112. The trailing ramp 113 has a larger angle of inclination, with respect to the plane of web 104. When the mounting bracket 100 is fastened to the ISO component, the distal edge 111 is located at a position rearward of the apex edge 112 and at a position spaced from but still closer to the side of an ISO component 200 than the apex edge 112. FIG. 6 further illustrates a flat surface 114 formed over a part of the apex edge 112 substantially parallel to the web support section 104.

Figure 2:
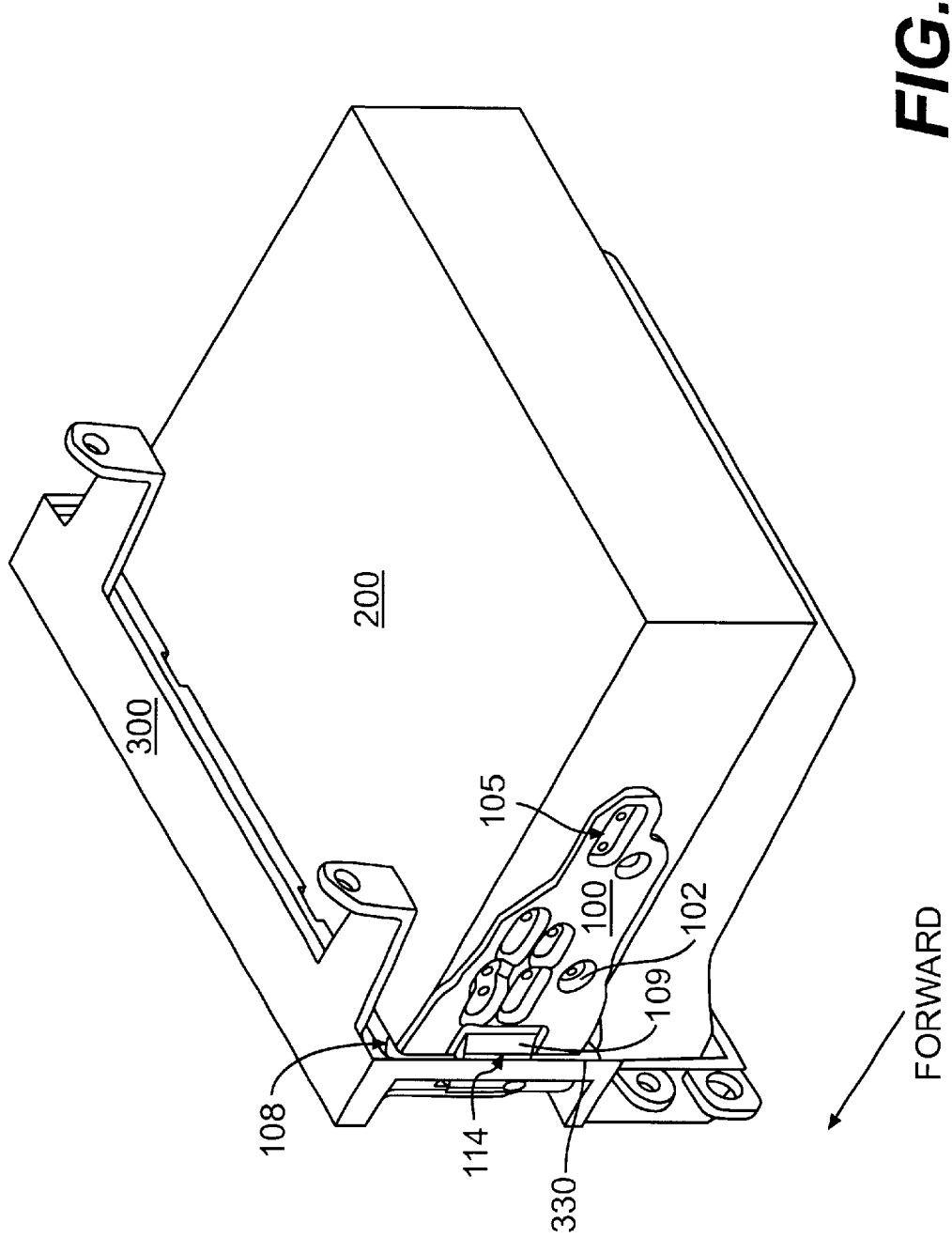
FIG. 2 is an assembled perspective view of the preferred embodiment shown in FIG. 1.
Figure 3:
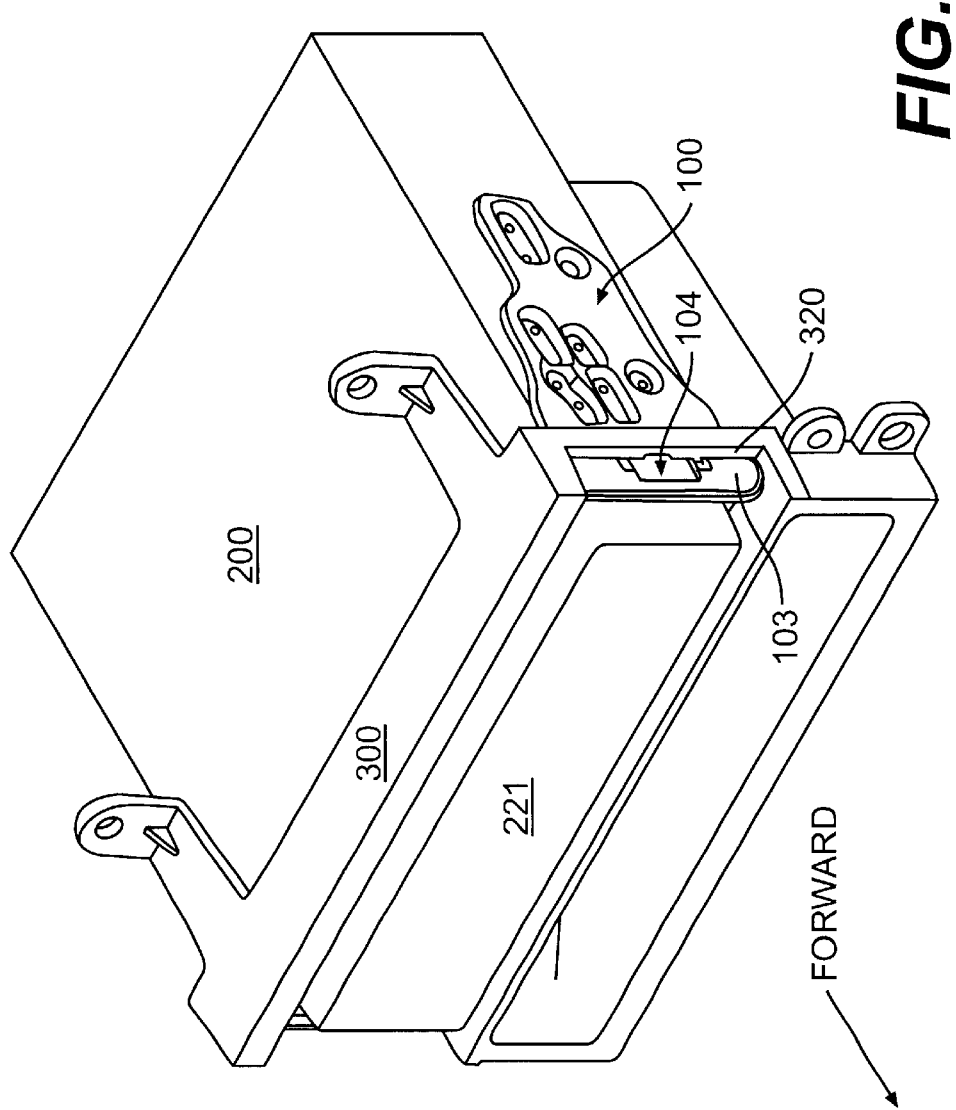
FIG. 3 is an assembled perspective view of the preferred embodiment shown in FIG. 1.
Figure 4:
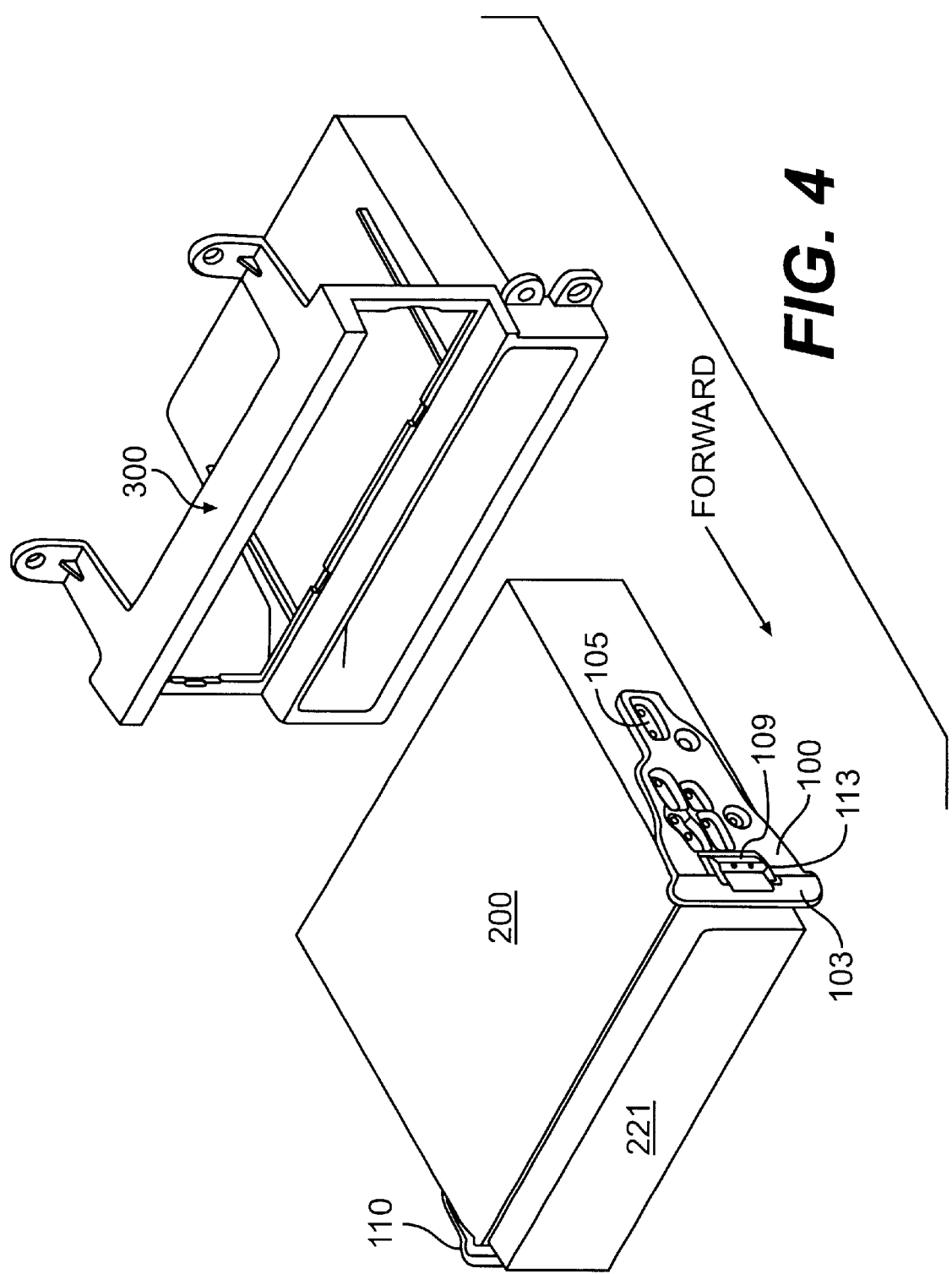
FIG. 4 is a partially assembled perspective view of the preferred embodiment shown in FIG. 1.

In this manner the ISO component 200 first is tightly held in the vicinity of its front side edges between a pair of brackets. The brackets in turn solely engage the DIN aperture. With the mounting brackets 100 and 110 tightly affixed to the ISO component 200, the ISO component is slidably inserted rearwardly into the DIN mounting kit, using the alignment shown in FIG. 4. Upon insertion, a portion near the distal edges 111 of the angled leading ramp 109 eventually comes into contact with first and second lands 341, 342, which have been recessed into both left and right vertical sides of the DIN aperture 310. As insertion continues, the lands 341, 342 slide along the angled leading ramp 109 away from the distal edge 111 towards the apex edge 112 causing the leading ramp 109 and the vertical ramp web support section 104 to continuously displace inwardly, toward the ISO component 200. The insertion is completed when the entire angled leading ramp 109 has passed the lands 341 and 342, the apex edge 112 is at a position rearward of the lands 341 and 342, and the web support section 104 has snapped back to the normal position, shown in FIG. 6. In this position, the angled trailing ramp 113 creates a second resilient engagement between the bracket and the lands 341 and 342. Hence, first a pair of mounting brackets 100 and 110 are tightly affixed against the front corners and sides of any ISO component 200, and then the brackets are translated rearwardly until an engaging component 103 on each bracket snaps tightly against the DIN aperture 310 of the representative kit 300. This engagement is shown through a rear perspective view at FIG. 2, and through a front perspective view at FIG. 3.

To remove the ISO component 200, a depressing device (e.g., flat-head screwdriver) is inserted between the outside of the web support section 104 and the inner most land 340, which has been cut into each vertical side of the DIN aperture 310. By applying an inward force with the depressing device against the flat 114, the cantilevered web support section 104 will move inwardly toward the ISO component 200, thereby releasing trailing ramp 113 from its resilient contact against the lands 341, 342. With further force, the apex edge 112 of the leading ramp 109 can be moved inwardly of the lands 341, 342 thereby allowing the ISO component 200 to be slidably moved forward and out of the DIN aperture 310.

While preferred embodiments of our invention have been shown and described, the invention is to be solely limited by the scope of the appended claims.

We claim:

1. A bracket for use in mounting an ISO audio component within a DIN aperture, the bracket comprising:
    a mounting component for abutting a vertical side of the ISO audio component;
    a plurality of apertures through the mounting component for affixing the mounting bracket to said ISO audio component, wherein the plurality of apertures is arranged in a pattern to align with one or more standard hole patterns on the vertical sides of automotive audio components;
    a securing clip protruding from the mounting component for detachably securing said ISO audio component within said DIN aperture; and
    an engaging component formed on a forward side of the mounting component for substantially engaging a front edge of the ISO audio component.

2. A mounting bracket according to claim 1, wherein the mounting bracket eliminates the need for a DIN cage when using an aperture designed specifically for a DIN unit.

3. A mounting bracket according to claim 1, wherein the mounting bracket provides sufficient support such that when the ISO audio component is mounted by the mounting bracket in the DIN aperture in the automobile, no further support is necessary to secure the automotive audio component.

4. A mounting bracket according to claim 1, wherein a standard hole pattern is that for an ISO-mount automotive audio component.

5. A mounting bracket according to claim 1, wherein the plurality of apertures includes only holes.

6. A mounting bracket according to claim 1, wherein the plurality of apertures includes only slots.

7. A mounting bracket according to claim 1, wherein the plurality of apertures includes both holes and slots.

8. A mounting bracket according to claim 1, wherein the plurality of apertures includes a chamfer for disallowing protrusion of a fastener from the mounting bracket.

9. A mounting bracket according to claim 1, wherein the mounting bracket may be released by depressing the securing clip with a depressing means.

10. A mounting bracket according to claim 9, wherein the depressing means is a flat-head screwdriver.

11. A kit for mounting an ISO audio component within a DIN aperture, the kit comprising:
    a plurality of brackets, the brackets comprising:
    a mounting component for abutting a vertical side of said ISO audio component;
    a plurality of apertures through the mounting component for affixing the mounting bracket to said ISO audio component, wherein the plurality of apertures is arranged in a pattern to align with one or more standard hole patterns on the vertical sides of automotive audio components;
    a securing clip protruding from the mounting component for detachably securing said ISO audio component within said DIN aperture; and
    an engaging component formed on a forward side of the mounting component for substantially engaging a front edge of the ISO audio component.

12. A bracket for mounting an audio component within an aperture, the bracket comprising:
    a mounting component for abutting a vertical side of the audio component;
    a plurality of apertures through the mounting component for affixing the mounting bracket to said audio component, wherein the plurality of apertures is arranged in a pattern to align with one or more standard hole patterns on the vertical sides of automotive audio components;
    a securing clip protruding from the mounting component for detachably securing said audio component within said aperture; and
    an engaging component formed on a forward side of the mounting component for substantially engaging a front edge of the audio component, wherein the engagement provides sufficient support such that when the audio component is mounted in the aperture, no further support is necessary to secure the audio component.

* * * * *